United States Patent [19]

Kihara et al.

[11] Patent Number: 4,914,620
[45] Date of Patent: Apr. 3, 1990

[54] CAPACITY EXTENSIBLE DATA STORAGE FOR USE IN ELECTRONIC APPARATUS

[75] Inventors: Yoshiro Kihara, Nara; Taiji Iizuka, Yamatokoriyama, both of Japan

[73] Assignee: Sharp Kabushiki Kaisha, Osaka, Japan

[21] Appl. No.: 274,680

[22] Filed: Nov. 21, 1988

Related U.S. Application Data

[63] Continuation of Ser. No. 165,387, Feb. 2, 1988, abandoned, which is a continuation of Ser. No. 9,088, Jan. 27, 1987, abandoned, which is a continuation of Ser. No. 563,176, Dec. 19, 1983, abandoned.

[30] Foreign Application Priority Data

Dec. 20, 1982 [JP] Japan ................................ 57-224755

[51] Int. Cl.⁴ .......................................... G06F 12/06
[52] U.S. Cl. .................................. 364/900; 364/957.3; 364/970.5

[58] Field of Search ... 364/200 MS File, 900 MS File

[56] References Cited

U.S. PATENT DOCUMENTS

| | | | |
|---|---|---|---|
| 4,025,771 | 5/1977 | Lynch, Jr. et al. | 364/200 |
| 4,149,243 | 4/1979 | Wallis | 364/200 |
| 4,168,523 | 9/1979 | Chari et al. | 364/200 |
| 4,432,067 | 2/1984 | Nielsen | 364/900 |
| 4,500,962 | 2/1985 | Lemaire et al. | 364/200 |

Primary Examiner—Thomas M. Heckler
Attorney, Agent, or Firm—Birch, Stewart, Kolasch & Birch

[57] ABSTRACT

A data storage and access system includes at every data block a pointer for storing the total number of data items to be stored therewithin and the start address data of data stored within a second data block following the first data format. Data capacity of the data storage system is extensible.

5 Claims, 2 Drawing Sheets

CAPACITY EXTENSIBLE DATA STORAGE FOR USE IN ELECTRONIC APPARATUS

This application is a continuation, of application Ser. No. 165,387 filed on Feb. 2, 1988, now abandoned, which is a continuation of Ser. No.: 009,088 filed 1/27/87 now abandoned; which is a continuation of Ser. No.: 563,176 filed 12/19/83 now abandoned.

BACKGROUND OF THE INVENTION

The present invention relates to a data storage system and a method for expanding data capacity.

Conventional data storage systems to store data such as voice data are constructed so that the data are stored successively. When a voice data system is completed, there is no way to add any additional data block. This is because there is no address data for directing the start address of the additional data block stored anywhere in the previous data, so that any control semiconductor device of a large scale integrated circuit (LSI) for voice synthesizing cannot retrieve the data from the additional data block.

It is thus desired to provide an improved data storage system for facilitating expansion of the data capacity.

SUMMARY OF THE INVENTION

Accordingly, it is an object of the present invention to provide an improved data storage system.

It is another object of the present invention to provide an improved data storage system for facilitating data capacity expansion.

It is a further object of the present invention to provide an improved data storage format for facilitating data capacity expansion.

It is a further object of the present invention to provide an improved method of retrieving data the capacity of which can be expanded.

Briefly described, in accordance with the present invention, a format of data storage includes at each data block a pointer for directing the total number of data items registered as data and the start address of the next data block. A plurality of such formats are aligned to expand the data capacity.

BRIEF DESCRIPTION OF THE DRAWINGS

The present invention will become more fully understood from the detailed description taken hereinbelow and the accompanying drawings which are given by way of illustration only, and thus are not limitative of the present invention and wherein.

DESCRIPTION OF THE INVENTION

Figure 1:
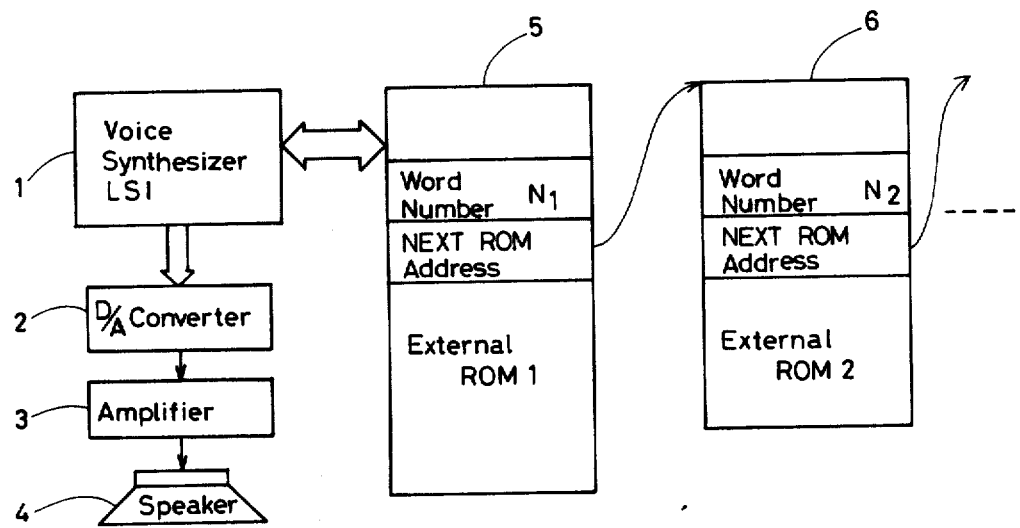
FIG. 1 shows a basic configuration of a voice synthesizing data storage system.

FIG. 1 shows a basic diagram of a voice synthesizing circuit to which the present invention can be applied although not limited to such a device.

The circuit of FIG. 1 comprises a control LSI 1, a D/A converter 2, an amplifier 3, a speaker 4, an external read only memory (ROM) 1 5, and an external ROM 2 6.

The control LSI 1 serves as a voice synthesizing LSI. The serial number of a word to be voice synthesized is applied to the voice synthesizing LSI 1. Responsive to this application, the LSI 1 accesses the external ROM 1 5, to read the voice data therefrom which corresponds to the serial number of the word to be voice synthesized. It may be possible that the external ROM is integrated within the voice synthesizing LSI 1. The read-in voice data are voice synthesized by the LSI 1, so that the synthesized data are transferred into the D/A converter 2 to obtain the corresponding analog waveforms. The analog waveforms are amplified by the amplifier 3 and spoken by the speaker 4.

Figure 2:
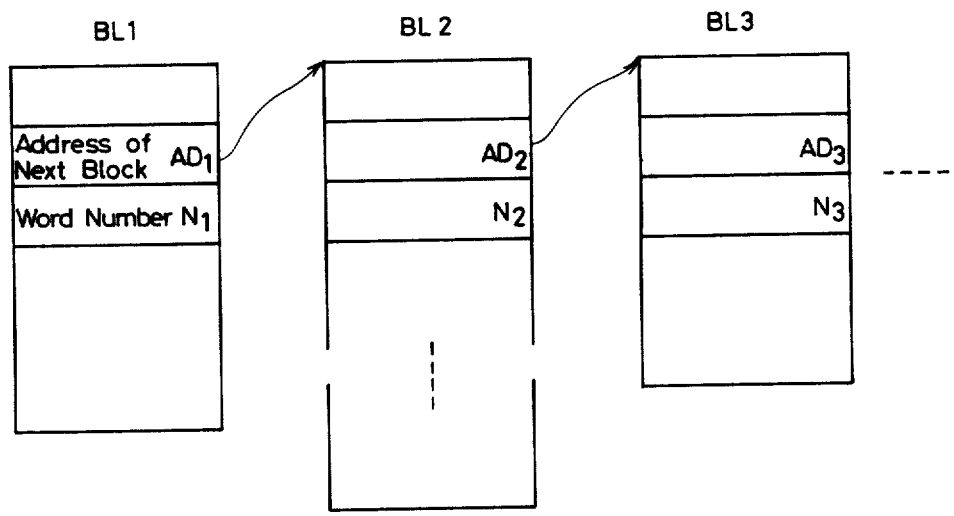
FIG. 2 shows a format of data storage according to the present invention.
Figure 3:
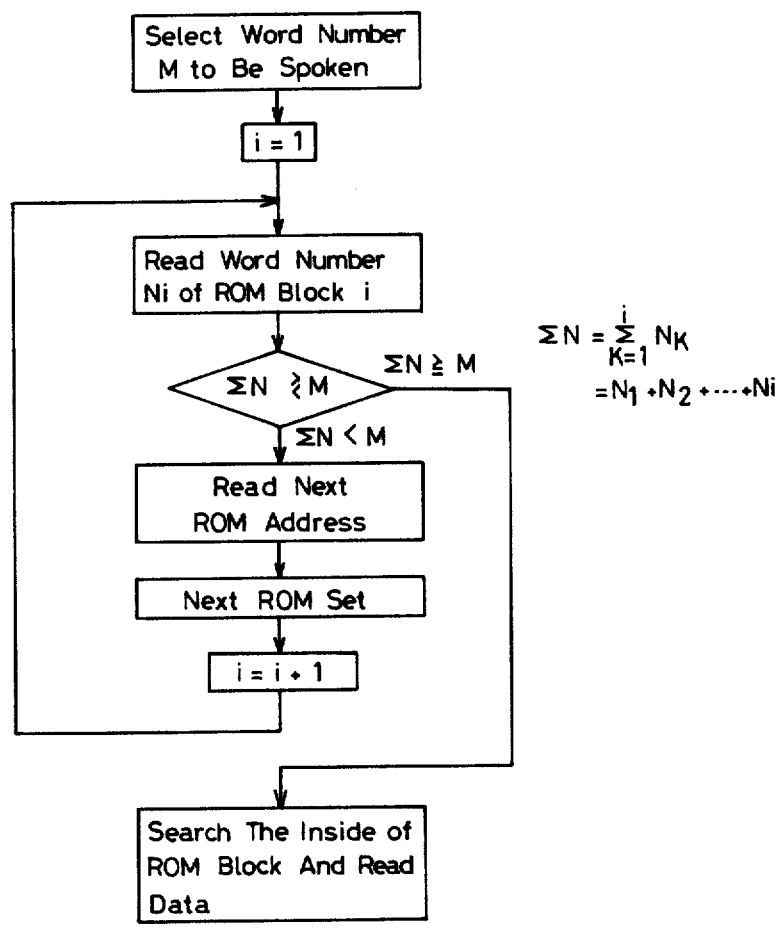
FIG. 3 shows a flow chart of the retrieval operation for the data storage system of FIG. 2.

FIG. 2 shows a data storage format of the external ROMs 5 and 6. FIG. 3 shows a flow chart of the data retrieval from the data format of FIG. 2.

Referring now to FIGS. 2 and 3, according to a feature of the present invention, the external ROM is accessed as follows. When the serial number M of the word to be voice synthesized is entered, the voice synthesizing LSI accesses the total word number N1 stored in a pointer in the data block BL1 to evaluate whether the total word number N1 is greater or smaller than the word serial number M. When the total number N1 is compared to and found to be smaller than the serial number M, this means that the block BL1 does not store a data item corresponding to the serial number M. The voice synthesizing LSI 1 then accesses an address pointer AD1 within the block BL1. Since the address pointer AD1 refers to the start address of the next data block BL2, the LSI 1 accesses the word number N2 from the data block BL2. Next, the sum of the word numbers (N1+N2) is compared to the serial number M to detect if the sum of the word numbers is greater or smaller than the serial number M. When this sum is equal to or greater than the serial number M, it means that the selected word is present within the block BL2. The voice synthesizing LSI 1 then accesses the data block BL2 to read-in the corresponding voice data.

Since the address table for storing the address of the next data block is stored in the previous data block, a plurality of data blocks can be retrieved referring to the address tables.

The number of the data blocks is not limited to two. For general purposes, the i-th start address pointer ADi and the i-th total word number pointer Ni are used in FIG. 3.

The start address pointer ADi and the total word number pointer Ni are positioned at the same position from the beginning of every data block in the plurality of data blocks, so that the addresses and the total number can be read out by a common retrieval operation.

The method and the data storage format for retrieving the corresponding data by directing the serial number of the data are as follows:

Each data block length is not fixed but variable. The address table of every data block is positioned near the head thereof. For example, a feature of any language translating device is that a target word is searched by retrieving a first word after the word serial number thereof is detected. In such a case, the address of the target word is read out from this address table. The address is referred to in order to obtain the target word.

Such an advantage can be expected in any voice synthesizing device for outputting voice data in response to the input of the serial number of the voice data.

In summary, the present invention provides the following advantages:

(1) The expansion of the data capacity can be enabled by aligning a plurality of data blocks.

(2) The data which could be stored within a single data block can be separated in a plurality of data blocks. If any data modification is needed, the data modification can be limited to one of the separated blocks. More particularly, when a single data block must include all the data, all the data are stored successively without any storage space therebetween. If the data must be modified, for example, to change the data length by one byte, all the data must be reformed. On the other hand, when the data are separated into a plurality of data blocks, so that every data block has some storage capacity between the data items, only the data block including the data to be modified has to be modified.

While only certain embodiments of the present invention has been described, it will be apparent to those skilled in the art that various changes modifications may be made therein without departing from the spirit and scope of the present invention as claimed.

What is claimed is:

1. A data storage and accessing system for a data processing device in which data storage can be increased readily and easily,
    a plurality of accessible data storage means for storing data, arranged sequentially, wherein each of said data storage means includes,
    a plurality of stored data word serial numbers and corresponding information data to be processed,
    a total word number pointer for storing a number corresponding to the number of data word serial numbers stored in the data storage means, and
    an address pointer for storing the address of the next data storage means in the sequence; and
    means for accessing particular data information to be processed corresponding to a particular data word serial number stored in one of said plurality of accessible data storage means including,
    means for comparing said particular data word serial number with a number corresponding to the total number pointer of the first of said sequentially arranged data storage means and accessing said particular information data, corresponding to said data word serial number stored in said first storage means, when said particular data word serial number is less than said number corresponding to said total word number pointer,
    means for accessing said next of said sequentially arranged data storage means by accessing said address pointer of said previous data storage means when said particular data word serial number is greater than said number corresponding to said total word number pointer of said previous data storage means,
    means for summing said number corresponding to said total word number pointer of the previous data storage means with the number corresponding to the total word number pointer of the next data storage means in the sequence and developing a number corresponding to a summation total of the word number pointers for the next data storage means in the sequence,
    means for comparing said particular data word serial number with said number corresponding to said summation total of the word number pointers for the next data storage means in the sequence to determine whether said particular data word serial number is contained in the next data storage means in the sequence,
    means for accessing said particular information data, corresponding to said data word serial number stored in the next data storage means in the sequence when said particular data word serial number is less than said number corresponding to said summation total of the word number pointers, and
    means for accessing a subsequent next data storage means in the sequence from the address pointer of the next block if said particular data word serial number is not stored in the next data storage means, to access the data word serial number stored in said subsequent next data storage means, wherein data storage can be readily and easily increased by adding additional data storage means in a similar sequential manner.

2. A data storage system as claimed in claim 1, wherein the data processing device is a voice synthesizer for producing audible speech.

3. A system as claimed in claim 1, wherein said information data is voice data and said particular data word number corresponds to a particular word to be voice synthesized.

4. A method of accessing data items contained in a plurality of sequentially arranged data blocks comprising the steps of:
    (a) reading a data word number of the data items to be accessed from a first block of said plurality of data blocks;
    (b) comparing the data word number with the contents of a pointer in a first data block of said sequence containing a number representing the total number of data items in the block;
    (c) determining whether the data item is contained in said first data block as a result of the comparison of the data word number and the number representing the total number of data items in the block;
    (d) reading said data item from said first data block if the data word number is less than the number representing the total number of data items in the block;
    (e) reading an address of the next data block in said sequence from an address pointer in said first data block if said data word number is greater than the number representing total number of data items in the block and summing said number representing the total number of data items for said first data block with a number representing total number of data items for said next data block; and
    (f) repeating steps b through d for the next data block.

5. A method as claimed in claim 4, wherein the accessed data items are voice data and the method is used in a voice synthesizer for producing audible speech.

* * * * *